United States Patent
Lagadec et al.

(10) Patent No.: US 7,658,328 B2
(45) Date of Patent: Feb. 9, 2010

(54) AUTHORIZATION VERIFICATION METHOD AND DEVICES SUITED THEREFOR

(75) Inventors: Roger Lagadec, Regensdorf (CH); Renato Cantini, Belfaux (CH); Bruno Messmer, Thun (CH)

(73) Assignee: Swisscom AG, Bern (CH)

( * ) Notice: Subject to any disclaimer, the term of this patent is extended or adjusted under 35 U.S.C. 154(b) by 828 days.

(21) Appl. No.: 10/576,262

(22) PCT Filed: Oct. 15, 2004

(86) PCT No.: PCT/CH2004/000625
§ 371 (c)(1),
(2), (4) Date: Apr. 17, 2006

(87) PCT Pub. No.: WO2005/036472
PCT Pub. Date: Apr. 21, 2005

(65) Prior Publication Data
US 2007/0023506 A1    Feb. 1, 2007

(30) Foreign Application Priority Data
Oct. 17, 2003    (EP)    .................... 03405752

(51) Int. Cl.
*G06K 5/00*    (2006.01)
(52) U.S. Cl. ...................... 235/382; 235/380
(58) Field of Classification Search ............ 235/380, 235/382, 382.5, 385, 487
See application file for complete search history.

(56) References Cited
U.S. PATENT DOCUMENTS

| | | | | |
|---|---|---|---|---|
| 5,729,594 A | * | 3/1998 | Klingman | 379/93.12 |
| 6,053,405 A | * | 4/2000 | Irwin et al. | 235/375 |
| 6,068,183 A | * | 5/2000 | Freeman et al. | 235/375 |
| 6,101,483 A | * | 8/2000 | Petrovich et al. | 705/26 |
| 6,237,786 B1 | * | 5/2001 | Ginter et al. | 213/153 |
| 2002/0111909 A1 | * | 8/2002 | Lee | 705/50 |
| 2003/0054801 A1 | | 3/2003 | Komu et al. | |

FOREIGN PATENT DOCUMENTS

| | | |
|---|---|---|
| DE | 100 34 275 | 1/2002 |
| EP | 1 345 180 | 9/2003 |
| WO | 02/48926 | 6/2002 |

* cited by examiner

*Primary Examiner*—Daniel St. Cyr
(74) *Attorney, Agent, or Firm*—Oblon, Spivak, McClelland, Maier & Neustadt, L.L.P.

(57) ABSTRACT

The invention relates to an authorization verification method and devices suited therefor, which play back authorization data via a user interface (11) of an electronic playback device (1). During the playback of authorization data via the user interface (11) of a first playback device (1), the playback attributes are modified. The playback of authorization data via the user interface (11) of the first playback device (1) is compared with the playback of reference data via a user interface (21) of a second electronic playback device (2). Authorization is granted in the event the playback of authorization data via the user interface (11) of the first playback device (1) matches the playback of reference data via the user interface (21) of the second playback device (2), and modifications of the playback attributes are, in essence, time-synchronized. The dynamic modification of the playback attributes during the playback of authorization data and playback of the reference data render practically impossible the unauthorized copying of image contents or audio contents for falsifying an authorization. In addition, a simultaneous playback of authorization data and reference data render unnecessary inquiries made to an authorization center (3).

33 Claims, 3 Drawing Sheets

AUTHORIZATION VERIFICATION METHOD AND DEVICES SUITED THEREFOR

TECHNICAL FIELD

The present invention relates to an authorization verification method and to devices suited therefor. The invention relates particularly to an authorization verification method in which authorization data are reproduced using a user interface of an electronic reproduction device, and to a system for authorization verification which comprises an electronic reproduction device having a user interface for reproducing the authorization data, and to a computer program product having computer program code means for controlling one or more processors in the reproduction device.

PRIOR ART

The use of electronic reproduction devices for reproducing authorization data using a user interface in the form of a display has the advantage that no one-off paper tickets need to be produced and distributed. Electronic reproduction devices for reproducing authorization data have the advantage that they can be used multiple times and for obtaining various services or for accessing various systems or buildings. In addition, electronic reproduction devices can be provided with communication modules, so that authorization data can be loaded dynamically into the reproduction devices via a telecommunication network.

Patent application DE 100 34 275 describes an authorization verification method in which access authorizations are transmitted via a mobile radio network to a mobile device, where they are shown on the display such that they can be (machine-)read by a barcode reader.

Patent application US 2003/0054801 describes an authorization verification method in which access authorizations are transmitted via a mobile radio network to a mobile device, where they are shown on a display in graphical form by a user-independent function and can be viewed by the eyes of a verifier. In addition, the verifier can check the authenticity of the graphically shown authorization data, in line with US 2003/0054801, by using a communication terminal to transmit a query to an authorization center. This involves requesting that the authorization data associated with the relevant user or with the relevant mobile device be transmitted from the authorization center to the verifier's communication terminal. To prevent unauthorized copies of the graphically shown authorization data, however, US 2003/0054801 also requires additional machine-readable visual features.

WO 02/48926 describes an authorization verification method in which the authorization verification involves user-specific transaction parameters being requested from a control center. The transaction parameters or a status code which is dependent thereon is/are transmitted from the control center to a verifier's terminal. In line with WO 02/48926, the status code is transmitted to a terminal belonging to the user and is displayed visibly to the verifier, with the status code being regularly renewed by the control center in order to increase security. The verifier's terminal generates the status code on the basis of an identical algorithm, so that both codes are changing continually and in sync but have the same value.

DISCLOSURE OF THE INVENTION

It is an object of the present invention to propose a new authorization verification method and also devices suited therefor which do not have the drawbacks of the prior art. In particular, the aim is to propose a new authorization verification method and devices suited therefor which allow authorization data to be reproduced using a user interface of an electronic reproduction device without the check on the authenticity of the authorization data reproduced requiring queries to an authorization center and without the authorization data having to be reproduced in machine-readable form in order to prevent unauthorized copies.

The present invention achieves these aims particularly by means of the elements of the independent claims. Further advantageous embodiments can also be found in the dependent claims and in the description.

The authorization data are reproduced using a user interface of a first electronic reproduction device.

The present invention achieves the abovementioned aims particularly by virtue of reproduction attributes being altered during the reproduction of the authorization data using the user interface of the first reproduction device. The reproduction attributes particularly comprise attributes which can be picked up by the human sensory organs, for example visual attributes of displayable objects, such as color, orientation, purpose of a picture section, position or font, or audio attributes of audibly reproducible objects, such as volume, pitch or tone length. The reproduction of the authorization data using the user interface of the first reproduction device is compared with the reproduction of reference data using a user interface of a second electronic reproduction device. Authorization is granted when there is a match between the reproduction of the authorization data using the user interface of the first reproduction device and the reproduction of the reference data using the user interface of the second reproduction device, and alterations in the reproduction attributes are essentially time-synchronized. The match between the reproduction of the authorization data and the reproduction of the reference data requires at least one match in the reproduction attributes. The reproduction of the authorization data by the first reproduction device and the reproduction of the reference data by the second reproduction device are picked up by the senses of a verifier, for example, and the verifier can grant the authorization, depending on application, if both reproduction devices reproduce data whose contents do not match using matching reproduction attributes and using time-synchronized changes in the matching reproduction attributes, or if both reproduction devices reproduce matching contents simultaneously and using synchronized alterations. That is to say that authorization can be granted, for example, if the two reproduction devices show simultaneously matching visual contents using the same visual attributes on their displays and/or reproduce simultaneously matching audible contents using the same audio attributes on their electroacoustic transducers. By way of example, the authorization data and the reference data comprise service descriptors in written form, with the authorization for the relevant service being grantable only if the service descriptor is reproduced by the two reproduction devices at the same time using the same font. If the service relates to a journey by rail, for example, then a match between the reproduction attributes changing in time sync is typically sufficient for the service descriptor. On the first reproduction device, belonging to a passenger, the service descriptor comprises the exact route, the class and the date, for example, whereas the service descriptor on the verifier's reproduction device merely comprises a train or route number, for example. By way of example, the authorization data comprise user identification data which are accepted as authentic only if they are reproduced using reproduction attributes which match reproduction attributes which are provided for this purpose and which are reproduced at the relevant time with the reference data. By way of example, a photograph of the user can be granted as user identification if it is displayed in the display at the position which matches the position which is simultaneously displayed for it in the display with the reproduced reference data. In the latter example too, it is sufficient to have a match between the reproduction attributes changing in time sync, namely the position at which the user identification data are displayed in the display, and no content match is required, because, by way of example, the system contains no available or accessible user identification data for display on the verifier's reproduction device. Since the reproduction of the authorization data is continually changing as a result of the dynamic change in the reproduction attributes, unauthorized copying of picture data or audio contents for the purpose of forging an authorization is practically impossible. In addition, there is no need for queries to an authorization center, since the authorization data and the reference data are reproduced at the same time by the two reproduction devices. If the authorization data relate to services, systems or buildings which are simultaneously used by a plurality of users, the authorization data can likewise be reproduced in sync using the user interfaces of the users' electronic reproduction devices, which means that a verifier does not need to have a separate second electronic reproduction device, but rather can compare the reproductions of the authorization data using the user interfaces of the users' electronic reproduction devices with one another. By way of example, this allows the authorization of train passengers to be checked by virtue of the verifier verifying whether the passengers' reproduction devices are reproducing mutually matching contents at the same time and using synchronized alterations.

Preferably, the authorization data are stored in a data 120 store of the first reproduction device, the reference data are stored in a data store of the second reproduction device, the reproduction of the authorization data using the user interface of the first reproduction device is based on a first synchronization signal, and the reproduction of the reference data using the user interface of the second reproduction device is based on a second synchronization signal. Storing the authorization data and the reference data in the reproduction devices allows authorizations to be transmitted individually to reproduction devices of the users without the need for an association between authorization data and users to be stored and managed in an authorization center. Storing the authorization data in a reproduction device also allows authorization or entrance tickets to be produced which are valid more than once and/or over longer periods of time.

In one variant embodiment, the first synchronization signal is produced in the first reproduction device and the second synchronization signal is produced in the second reproduction device. This variant embodiment allows maximum independence of the reproduction devices. The reproduction of the authorization data and the reproduction of the reference data are synchronized on the basis of signaling signals which are produced independently of one another in the reproduction devices.

In one variant embodiment, the first synchronization signal is produced in the first reproduction device on the basis of a signal which has been received in the first reproduction device from the second reproduction device, or the second synchronization signal is conversely produced in the second reproduction device on the basis of a signal which has been received in the second reproduction device from the first reproduction device. This variant embodiment brings about closer coupling of the reproduction devices, preferably via a device interface. Secondly, more precise synchronization between the reproduction devices can be achieved, since the synchronization of the reproduction of the authorization data and of the reproduction of the reference data is based on a synchronization signal which is produced in one of the reproduction devices.

In one variant embodiment, the first synchronization signal and the second synchronization signal are produced in the first reproduction device and in the second reproduction device, respectively, on the basis of a signal received from a computer-based authorization center. This variant embodiment has the advantage that the reproduction devices need to have neither time determination means for producing the synchronization signals nor device interfaces for synchronizing the synchronization signals. Together with the signal for synchronizing the synchronization signals, the authorization center can also transmit reproduction attributes and/or details regarding the change in the reproduction attributes to the reproduction devices.

In one variant embodiment, the authorization data are stored in a data store of a computer-based authorization center, and the authorization data and the reference data are transmitted from the authorization center essentially in time sync via a telecommunication network to the first reproduction device and to the second reproduction device, respectively. This variant embodiment allows authorization data to be transmitted in "push mode" dynamically to the reproduction devices, which makes it even more difficult to copy authorization data without authorization.

Preferably, the alteration of reproduction attributes in the reproduction of the authorization data and in the reproduction of the reference data is made on the basis of relevant data in the authorization data and in the reference data, respectively. That is to say that the reproduction attributes are changed during the reproduction of the authorization data and of the reference data on the basis of rule data, instruction data, algorithms and/or attribute change parameters which are contained in the authorization data and reference data, respectively. This allows a dynamic change in the reproduction attributes independently of an authorization center.

In one variant embodiment, the alteration of reproduction attributes in the reproduction of the authorization data and in the reproduction of the reference data is made on the basis of relevant data which are transmitted from an authorization center via a telecommunication network to the first reproduction device and to the second reproduction device, respectively. The dynamic transmission of details for altering the reproduction attributes from the authorization center to the reproduction devices makes it impossible to foresee the alterations in the reproduction attributes.

In one variant embodiment, the authorization data are transmitted from an authorization center via a telecommunication network to the first reproduction device, and the alteration of reproduction attributes in the reproduction of the authorization data is made on the basis of reproduction control data which are transmitted from a reproduction control center via the telecommunication network to the first reproduction device. The reference data are transmitted from the reproduction control center via the telecommunication network to the second reproduction device, and the alteration of reproduction attributes in the reproduction of the reference data is made on the basis of data which are transmitted from the reproduction control center via the telecommunication network to the second reproduction device. The use of separate sources and transmission paths firstly for the information which is to be verified, particularly for the authorization data, and secondly for the reproduction control data allows various operators and service providers, respectively, to be defined which are responsible for providing the information which is to be verified (authorization data) or for controlling the reproduction of the information which is to be verified. That is to say that it is possible to produce a system and a method for verifying information, particularly an authorization verification method and a system for the authorization verification, in which the service provider controlling the reproduction of the information which is to be verified on the reproduction devices has no insight into the information which is to be verified, and in which the service provider providing the information which is to be verified (authorization data) has no insight into the control of the reproduction of the information which is to be verified.

In one variant embodiment, the first reproduction device is in the form of a mobile communication terminal. Mobile communication terminals are particularly suitable for receiving authorization data, details regarding the alteration in the reproduction attributes and/or synchronization signals dynamically from an authorization center via a mobile radio network. The first reproduction device may also be in the form of a chip card which is provided with a display, for example.

BRIEF DESCRIPTION OF THE DRAWINGS

An embodiment of the present invention is described below using an example. The example of the embodiment is illustrated by the following appended figures.

MODES OF IMPLEMENTING THE INVENTION

In FIGS. 1, 2, 3, 4 and 7, the reference symbol 3 relates to a computer-based authorization center which comprises one or more computers and can be connected to the reproduction devices 1, 2 via the telecommunication network 8.

The telecommunication network 8 preferably comprises a mobile radio network, for example a GSM (Global System for Mobile Communication), a UMTS network (Universal Mobile Telephone System) or a WLAN (Wireless Local Area Network). The telecommunication network 8 may also comprise a landline network, for example the Internet.

The reproduction devices 1, 2 are preferably in the form of mobile communication terminals, for example mobile radio telephones, PDA (Personal Data Assistant) computers or laptop computers. The reproduction devices 1, 2 may also be in the form of fixed communication terminals or in the form of chip cards, with the latter being connected to a communication terminal, for example to a mobile communication terminal, in order to connect to the authorization center 3.

Figure 1:
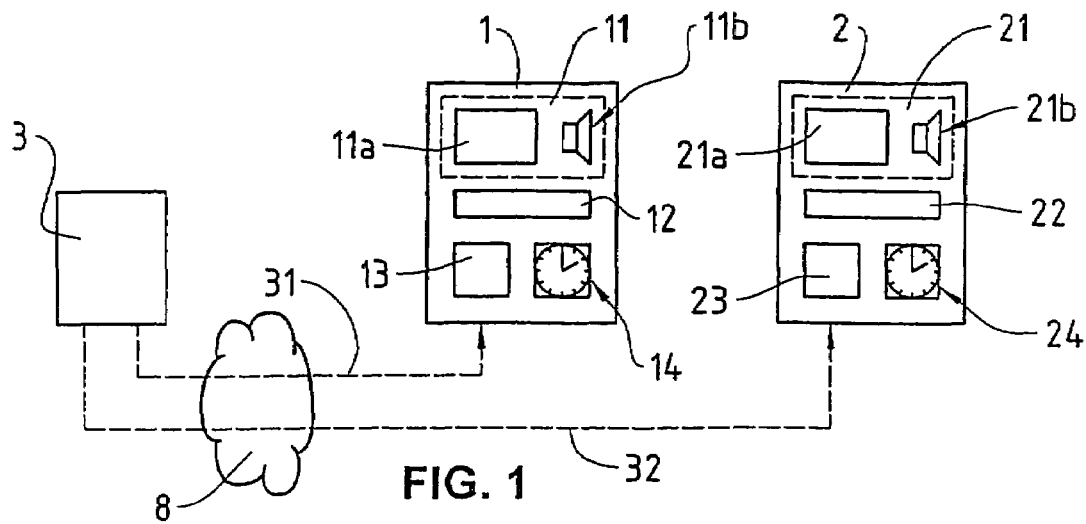
FIG. 1 shows a block diagram which schematically shows reproduction devices which are provided with user interfaces and are set up to produce a synchronization signal.
Figure 2:
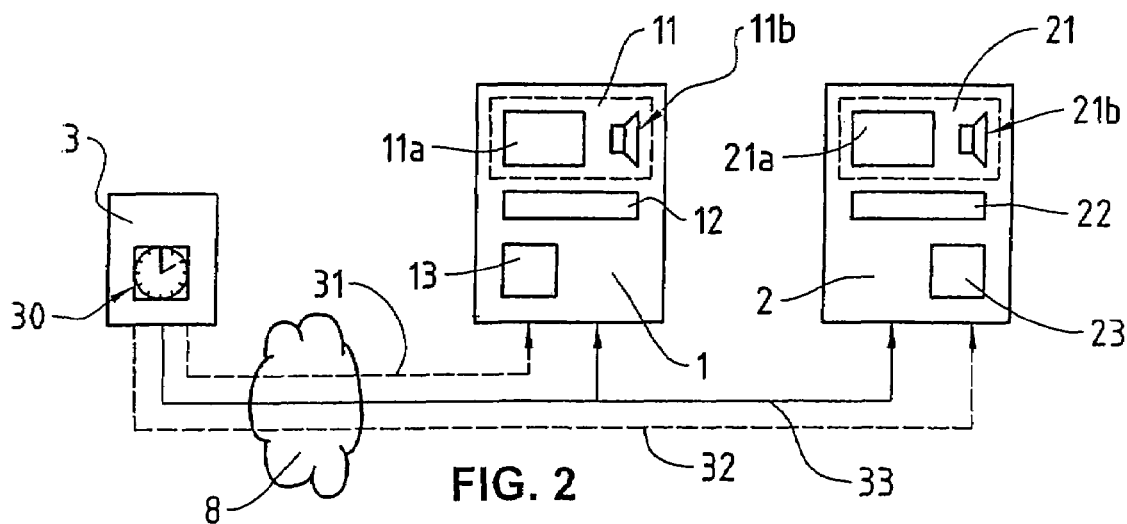
FIG. 2 shows a block diagram which schematically shows reproduction devices which are provided with user interfaces and are connected to an authorization center which is set up to produce a synchronization signal.
Figure 3:
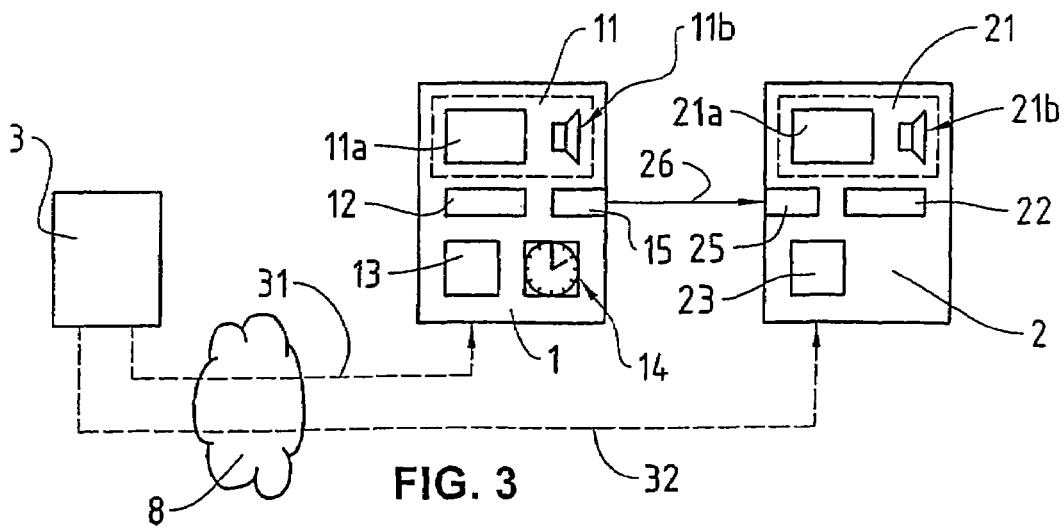
FIG. 3 shows a block diagram which schematically shows reproduction devices which are provided with user interfaces, where one of the reproduction devices is set up to produce a synchronization signal and to transmit it to the other reproduction device.

As FIGS. 1, 2 and 3 show, the reproduction device 1 comprises a data store 13 for storing authorization data, and the reproduction device 2 comprises a data store 23 for storing reference data. As FIGS. 1, 2 and 3 schematically show by means of the dashed arrow 31, the authorization data are transmitted from the authorization center 3 via the telecommunication network 8 to the reproduction device 1, where they are stored in the data store 13. Correspondingly, as FIGS. 1, 2 and 3 schematically show by means of the dashed arrow 32, the reference data are transmitted from the authorization center 3 via the telecommunication network 8 to the reproduction device 2, where they are stored in the data store 23. The authorization data and the reference data can also be stored without using the telecommunication network 8, by means of direct programming in the data stores 13 and 23, respectively, for example at a sales point or with a manufacturer of mobile data storage media.

Figure 4:
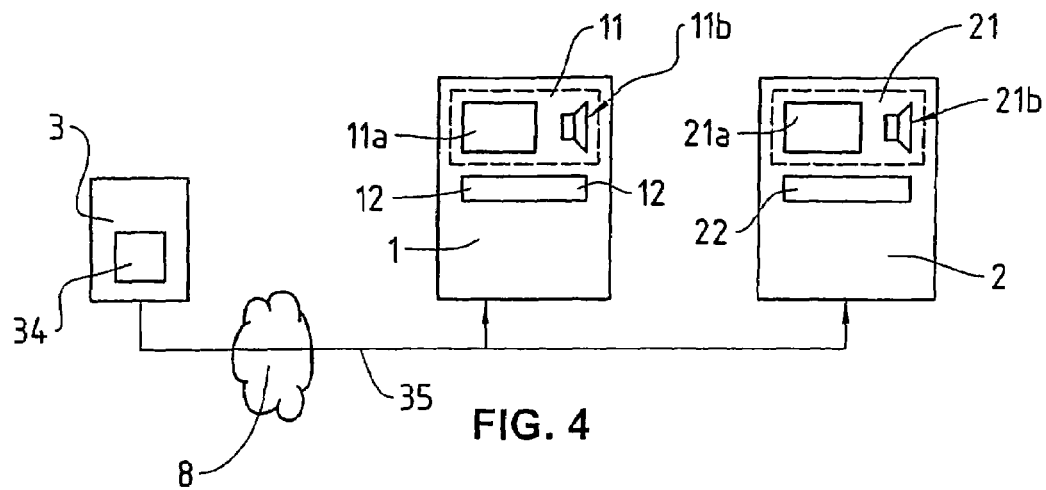
FIG. 4 shows a block diagram which schematically shows reproduction devices which are provided with user interfaces and are connected to an authorization center which is set up for synchronized transmission of authorized data to the reproduction devices.

FIG. 4 shows an alternative variant embodiment in which the authorization data and the reference data, respectively, as shown schematically by means of the dashed arrow 35, are transmitted from the authorization center 3 in sync in push mode via the telecommunication network 8 to the reproduction devices 1 and 2, respectively, for reproduction.

Figure 7:
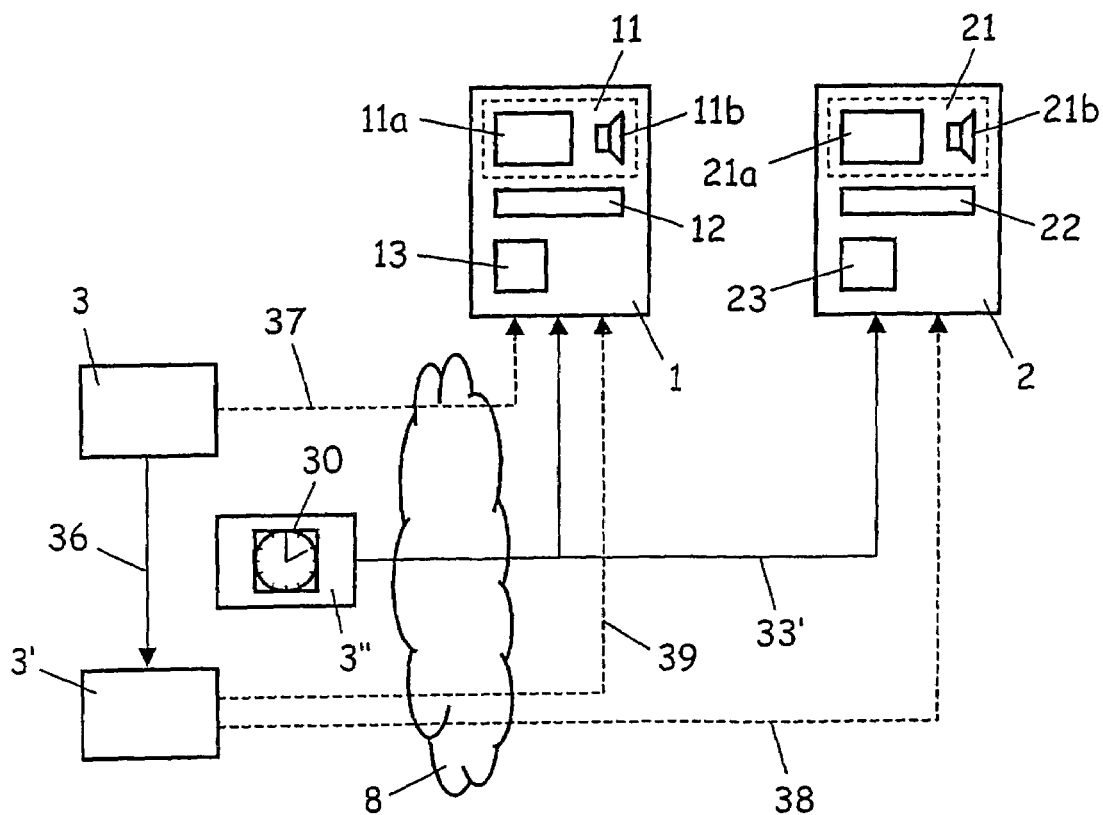
FIG. 7 shows a block diagram which schematically shows reproduction devices which are provided with user interfaces and which are connected both to an authorization center and to a reproduction control center.

FIG. 7 shows a further alternative variant embodiment, which is subsequently called the service provider separation variant. In FIG. 7, the reference symbol 3' relates to a computer-based reproduction control center and the reference symbol 3" relates to a computer-based synchronization center, which each comprise one or more computers and can be connected to the reproduction devices 1, 2 via the telecommunication network 8. In the service provider separation variant, the provision of authorization data (information which is to be verified) and the provision of reference data and also optionally the production of a synchronization signal are performed by separate service providers and separate computer-based units, respectively. As FIG. 7 schematically shows by means of the dashed arrow 37, the authorization data are transmitted from the authorization center 3 together with a verification identifier via the telecommunication network 8 to the reproduction device 1, where they are stored in the data store 13. By contrast, the reference data are transmitted from the reproduction control center 3' via the telecommunication network 8 to the reproduction device 2, where they are stored in the data store 23, as schematically shown by means of the dashed arrow 38.

As FIGS. 1, 2, 3 and 4 schematically show, the reproduction devices 1, 2 each comprise a user interface 11 and 21, respectively, for reproducing authorization data and reference data, respectively. The user interfaces 11, 21 preferably comprise a display 11a, 21a for displaying visual objects such as pictures, graphics, video and text. The user interfaces 11, 21 also comprise an electroacoustic transducer 11b, 21b (loudspeaker, headphones) for reproducing audio objects such as voice, sound patterns, noises or music. The user interfaces 11 and 21, respectively, can also comprise further modules for reproducing authorization data and reference data, respectively, which can be picked up by a user's sensory organs, for example a vibration module or an actuator module for producing codes which can be picked up by the user in tactile fashion (for example in Braille).

The reproduction device 1 additionally comprises a reproduction module 12 for reproducing authorization data stored in a data store 13 using the user interface 11 or for reproducing authorization data which have been received from the authorization center 3 in push mode using the user interface 11. The reproduction device 2 comprises an appropriate reproduction module 22 for reproducing reference data stored in the data store 23 using the user interface 21 or for reproducing reference data which have been received from the authorization center 3 in push mode using the user interface 21. The authorization data and reference data, respectively, are reproduced by the reproduction modules 12 and 22, respectively, preferably on the basis of a synchronization signal, as is described in more detail later.

The authorization data and the reference data comprise data objects such as digitized picture, video, text, numerical, graphical and/or audio information. In addition, the authorization data and the reference data preferably comprise details regarding the alteration of reproduction attributes. The details regarding the alteration of reproduction attributes can also be transmitted from the authorization center 3, for example together with the synchronization signal, to the reproduction devices 1, 2 in the variant embodiment shown in FIG. 2. The reproduction attributes determine the reproduction of the authorization data and the reproduction of the reference data, respectively. The reproduction attributes particularly comprise visual attributes of displayable objects, such as color, orientation, picture section identification, position or font, or audio attributes of audibly reproducible objects, such as volume, pitch or tone length. The details regarding the alteration of the reproduction attributes comprise attribute change instructions, attribute change rules and/or attribute change algorithms. Depending on form, the details regarding the alteration of the reproduction attributes also comprise attribute change parameters such as values of reproduction attributes and/or object identifiers.

In the aforementioned service provider separation variant, which is shown in FIG. 7, the authorization data comprise no details regarding the alteration of reproduction attributes, but rather merely information which is to be verified, for example details regarding the determination of a service, such as a service descriptor, or details about personal information for a user, such as the solvency of a user. As shown schematically by means of the arrow 36, the authorization center 3 transmits a data record with the aforementioned verification identifier and with details about the desired level of security to the reproduction control center 3', for example via the telecommunication network 8. In the reproduction control center 3', stored data objects, such as digitized picture, video, text, numerical, graphical and/or audio information, and also details regarding the alteration of reproduction attributes, for example changing reproduction attributes, are determined on the basis of the received level of security. The data objects determined, the details regarding the alteration of reproduction attributes and also the verification identifier are transmitted from the reproduction control center 3' as reproduction control data via the telecommunication network 8 to the reproduction device 1, as shown schematically by the dashed arrow 39. With the reference data, the data objects determined and also the details regarding the alteration of reproduction attributes are also transmitted from the reproduction control center 3' via the telecommunication network 8 to the reproduction device 2, as shown schematically by the dashed arrow 38. The reference data also comprise a reference text, which, by way of example, comprises details regarding the identification of the reproduction control center 3' and of the operator of the reproduction control center 3', respectively. The reproduction devices 1, 2 are addressed by the reproduction control center 3' on the basis of the verification identifier. The address information for the reproduction devices 1, 2 is held in the verification identifier, for example, or can be requested using the verification identifier in a registration database.

The use of synchronization signals or the transmission of authorization data and reference data in push mode achieves synchronization of the reproduction of the authorization data by the reproduction module 12 and of the reproduction of the reference data by the reproduction module 22. During the synchronization based on synchronization signals, the authorization data and the reference data are reproduced by the reproduction modules 12 and 22, respectively, on the basis of the associated details regarding the alteration in the reproduction attributes. Depending on form, the synchronization signals start automatically running attribute change algorithms or they initiate the execution of an attribute change instruction or attribute change rule using associated values of reproduction attributes, as illustrated later using an example. The execution of an attribute change algorithm or the execution of a plurality of attribute change instructions or attribute change rules dynamically alters the reproduction of the authorization data and the reproduction of the reference data. If there is a match between the reproduction of the authorization data using the user interface 11 of the reproduction device 1 and the reproduction of the reference data using the user interface 21 of the reproduction device 2, and the alterations in the reproduction attributes are also essentially in time sync, the user of the reproduction device 1 can be granted authorization by a verifier who is using the reproduction device 2. The match between the reproduction of the authorization data using the user interface 11 of the reproduction device 1 and the reproduction of the reference data using the user interface 21 of the reproduction device 2 requires at least one match in the reproduction attributes.

The synchronization signals can be periodic or aperiodic signals. The synchronization signals are dependent on the authorization data and on the reference data, respectively, for example.

In the variant embodiment shown in FIG. 1, the reproduction devices 1, 2 each comprise a synchronization module 14 and 24, respectively, for producing a synchronization signal which is used as a basis for reproducing the authorization data and the reference data, respectively. The synchronization modules 14, 24 comprise a time determination module, for example, which determines the current time or a particular period of time on the basis of a clock generator and/or on the basis of received time details.

In the variant embodiment shown in FIG. 3, just one of the reproduction devices 1, 2 comprises a synchronization module 14 for producing the synchronization signal. In addition, the reproduction devices 1, 2 shown in FIG. 3 comprise a device interface 15 and 25, respectively, however, in order to transmit the synchronization signal produced to the relevant other reproduction device (arrow 26), for example an infrared interface or a radio interface such as "Bluetooth".

In the variant embodiment shown in FIG. 2, the authorization center 3 comprises a synchronization module 30 for producing and transmitting a synchronization signal (arrow 33) to the reproduction devices 1, 2.

In the variant embodiment shown in FIG. 7, the synchronization module 30 is arranged in the synchronization center 3", and the synchronization signal is transmitted from the synchronization center 3" to the reproduction devices 1, 2 in line with arrow 33'.

Figure 6:
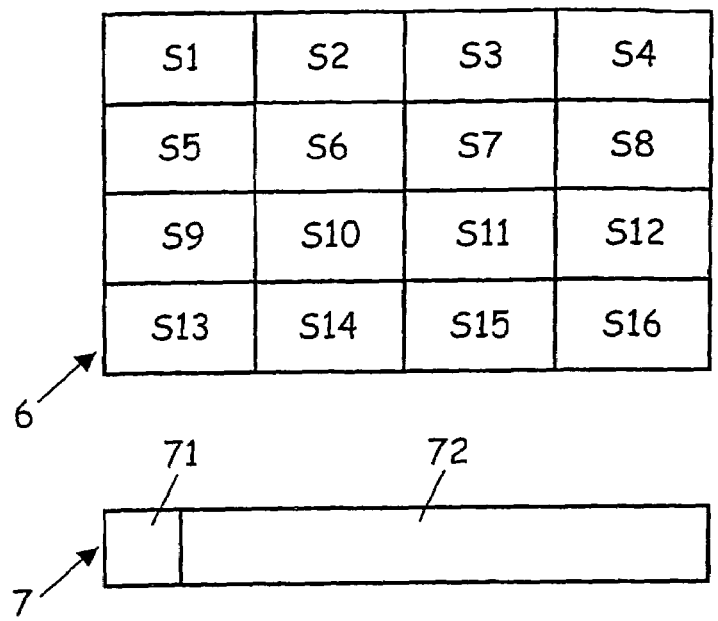
FIG. 6 shows a picture with a plurality of picture segments and also shows a data record with a picture object identifier and a sequence of picture segment identifiers.

By way of example, the authorization data and reference data, respectively comprise a picture object 6 comprising a plurality of picture segments S1 to S16, as shown schematically in FIG. 6. The authorization data and reference data, respectively, also comprise a data record 7 shown in FIG. 6 with details regarding the alteration of reproduction attributes. The data record 7 comprises a picture object identifier 71 for identifying the picture object 6 and comprises a randomly-generated sequence 72 of picture segment identifiers for the picture segments S1 to S16. The sequence of picture segment identifiers can also be produced dynamically by an attribute change algorithm. In the service provider separation variant shown in FIG. 7, the picture object 6 and the data record 7 are transmitted from the reproduction control center 3' to the reproduction device 1 in the reproduction control data.

Synchronized by synchronization signals, the reproduction modules 12, 22 determine the picture object 6 on the basis of the picture object identifier 71 and select from the picture segments S1 to S16 the one determined by the first picture segment identifier in the sequence 72 for reproduction. The picture segment is determined by the reproduction modules 12, 22 by executing appropriate attribute change algorithms, attribute change instructions or attribute change rules which are part of the software modules in the reproduction modules 12, 22 or which are held in the details regarding the alteration of reproduction attributes. In line with the relevant attribute change algorithm or the relevant attribute change rules, the reproduction modules 12, 22 select the next picture segment for reproduction, which is determined by the next picture segment identifier in the sequence 72, upon the next signaling signal or after a predefined period of time. The picture segment identifiers can also have associated time details in the sequence 72, however, which determine which of the picture segments S1 to S16 is chosen at a particular time or after a particular period of time by the reproduction modules 12, 22 for reproduction.

The authorization data and reference data, respectively, also comprise a service descriptor, for example the name of a service, of a system or of a building in the form of text data. The service descriptor has associated details regarding the alterations of reproduction attributes, which each determine the position and the font of the service descriptor for reproduction at a time determined by synchronization signals. In the service provider separation variant shown in FIG. 7, the reference data comprise the aforementioned reference text instead of the service descriptor or instead of the information which is to be verified.

The authorization data and reference data, respectively, optionally also comprise a user identification field, that is to say details regarding the determination of a display segment in which a user identifier can be displayed. The user identification field has associated details regarding the alteration of reproduction attributes, which each determine the position of the user identification field for reproducing the user identifier at a time determined by synchronization signals.

Figure 5A:
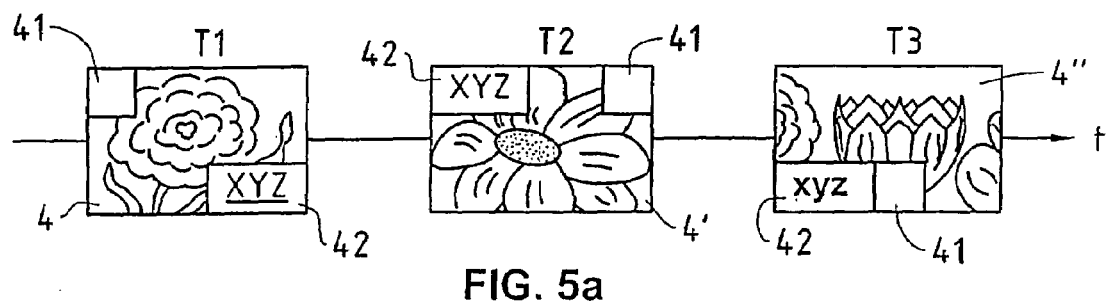
FIG. 5a shows a time axis along which reference data reproduced using the user interface of a reproduction device are shown at various times.
Figure 5B:
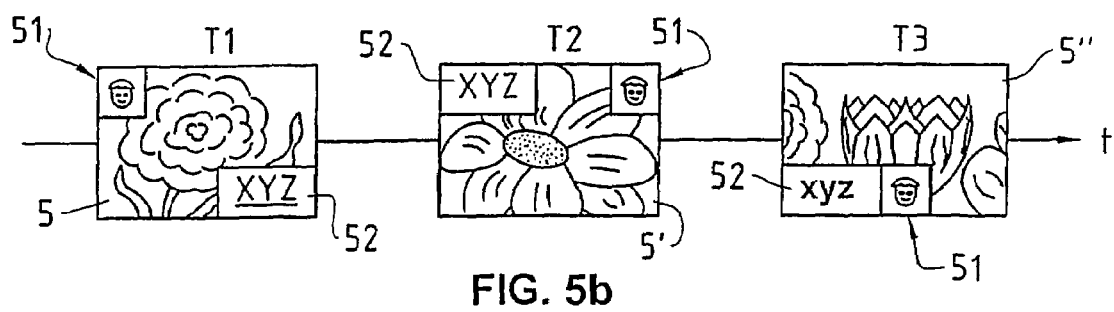
FIG. 5b shows a time axis along which authorization data reproduced using the user interface of a reproduction device are shown at various times.

The sections below describe the method flow for authorization verification with reference to FIGS. 5*a* and 5*b*. During authorization verification, the reproduction modules 12, 22 are activated for reproducing the authorization data and reference data, respectively. Selection of the relevant authorization data and reference data, respectively, for the relevant service or for access to the relevant system or building is not discussed in more detail here. Neither is a more detailed discussion provided here for the option of partly cancelling authorization data, for example as in the case of multitrip tickets. FIG. 5*a* shows the picture contents which are displayed at times T1, T2 and T3 on the display 21*a* of the reproduction device 2. FIG. 5*b* shows the picture contents which are displayed at the same times T1, T2 and T3 on the display 11*a* of the reproduction device 1.

In FIG. 5*a*, the reference symbol 4 denotes the picture content which is displayed at time T1 on the display 21*a* of the reproduction device 2. The reproduced picture content 4 is based on the reproduction of the reference data which are stored in the data store 23 or are received in the reproduction device 2 via the telecommunication network 8 in push mode. The reproduced picture content 4 is determined firstly by the details regarding the alteration of the reproduction attributes, which are held in the reference data or are received in the reproduction device 2 via the telecommunication network 8, and secondly by the synchronization signal which is produced in the reproduction device 2 or which is received in the reproduction device 2 via the telecommunication network 8 or the device interface 25. The picture content 4 comprises a picture object, e.g. a flower, which is determined as described above with reference to FIG. 6, for example. Besides the picture object of the flower, the picture content 4 comprises a user identification field 41 for reproducing a user identifier, the geometrical position of the user identification field 41 being determined by an appropriate reproduction attribute which is active at time T1. In addition, the picture content 4 comprises a service descriptor 42 whose geometrical position and whose font are determined by appropriate reproduction attributes which are active at time T1.

In FIG. 5*b*, the reference symbol 5 denotes the picture content which is displayed at time T1 on the display 11*a* of the reproduction device 1. The reproduced picture content 5 is based on the reproduction of the authorization data which are stored in the data store 13 or are received in the reproduction device 1 via the telecommunication network 8 in push mode. The reproduced picture content 5 is determined firstly by the details regarding the alteration of the reproduction attributes, which are held in the authorization data or are received in the reproduction device 1 via the telecommunication network 8, and secondly by the synchronization signal which is produced in the reproduction device 1 or which is received in the reproduction device 1 via the telecommunication network 8 or the device interface 15. In the service provider separation variant shown in FIG. 7, the authorization data from the authorization center 3 and the reproduction control data from the reproduction control center 3' are associated with one another in the reproduction device 1 on the basis of the verification identifier. If the reproduced authorization data are intended to result in grantable authorization, the picture content 5 comprises the same picture object, i.e. the same flower, as the picture content 4. In addition, the picture content 5 needs to comprise a user identification field 51 whose geometrical position corresponds to that of the user identification field 41. Finally, depending on application, the picture content 5 needs to comprise the same service descriptor 52 as the service descriptor 42 or a service descriptor 52 whose content does not match and the aforementioned reference text, respectively, but the reproduction attributes of the service descriptor 52, namely the geometrical position and font, need to correspond to the reproduction attributes of the service descriptor 42 and of the reference text, respectively. As FIG. 5*a* shows, the user identification field 51 shows a user identifier, for example a picture of the user or his name. The user identifier can be permanently stored in the reproduction device 1, for example, or can be part of the authorization data or can be based on a subscriber identifier stored in a SIM card (Subscriber Identity Module).

To grant an authorization, however, the verifier compares the reproduction of the reference data on the display 21a of his reproduction device 2 with the reproduction of the authorization data on the display 11a of the reproduction device 1 belonging to the user during further times T2 and T3, which are one or more seconds apart, for example. As can be seen from FIGS. 5a and 5b, the respective reproduction attributes change in the picture contents 4' and 5' at time T2 and in the picture contents 4" and 5" at time T3. A respective different picture segment of the picture object 6 is reproduced, the position and the font of the service descriptor 42 and of the service descriptor 52 and of the reference text, respectively, change, and the position of the user identification fields 41 and 51, respectively, moves.

At this juncture, it should be stated that, in one variant embodiment, authorization can also be granted if the reproduction of the reference data on the display 21a of the reproduction device 2 belonging to the verifier and the reproduction of the authorization data on the display 11a of the reproduction device 1 belonging to the user are effected with a slight time shift, for example if reproduced picture sequences are not precisely in sync. For this, it is useful, for example, if picture contents change only in part, so that even with imperfect synchronization it is possible to compare at least those picture contents which do not change during a sequence transition.

The method described is preferably used for authorization verification or for general verification of information in cases in which the reproduction devices 1, 2 of the service user and of the verifier can be compared at the location of the service, for example on public transport means or during access verification at sports events, in the theatre or at the cinema. The method described may alternatively be used when the reproduction devices 1, 2 of the service user and of the verifier are remote from one another. In the latter case, the service user describes the reproduction of the authorization data to the verifier using a communication link, and the verifier compares the description with the reproduction of the reference data. When reproduction devices 1, 2 are remote from one another, authorization data which are reproduced audibly and are transmitted via a communication link, for example a telephone link, to the verifier for comparison with the audible reproduction of the reference data are also suitable, in particular.

The invention claimed is:

1. An authorization verification method, comprising:
reproduction of authorization data using a user interface of a first electronic reproduction device;
comparison of the reproduction of the authorization data using the user interface of the first reproduction device with the reproduction of reference data using a user interface of a second electronic reproduction device;
alteration of reproduction attributes during the reproduction of the authorization data using the user interface of the first reproduction device, so that the reproduction of the authorization data changes dynamically; and
granting of the authorization when there is a match between the reproduction of the authorization data using the user interface of the first reproduction device and the reproduction of the reference data using the user interface of the second reproduction device, where the match between the reproduction of the authorization data and the reproduction of the reference data is at least in the reproduction attributes, and alterations in the reproduction attributes are time-synchronized.

2. The authorization verification method as claimed in claim 1, wherein the authorization data are stored in a data store of the first reproduction device, the reference data are stored in a data store of the second reproduction device, and the alteration of reproduction attributes is made based on details regarding the alteration of reproduction attributes.

3. The authorization verification method as claimed in claim 2, wherein the reproduction of the authorization data using the user interface of the first reproduction device is based on a first synchronization signal, the reproduction of the reference data using the user interface of the second reproduction device is based on a second synchronization signal, the first synchronization signal is produced in the first reproduction device, and the second synchronization signal is produced in the second reproduction device.

4. The authorization verification method as claimed in claim 2, wherein the reproduction of the authorization data using the user interface of the first reproduction device is based on a first synchronization signal, the reproduction of the reference data using the user interface of the second reproduction device is based on a second synchronization signal, and the first synchronization signal is produced in the first reproduction device based on a signal that has been received in the first reproduction device from the second reproduction device, or the second synchronization signal is produced in the second reproduction device based on a signal that has been received in the second reproduction device from the first reproduction device.

5. The authorization verification method as claimed in claim 2, wherein the reproduction of the authorization data using the user interface of the first reproduction device is based on a first synchronization signal, the reproduction of the reference data using the user interface of the second reproduction device is based on a second synchronization signal, and the first synchronization signal and the second synchronization signal are produced in the first reproduction device and in the second reproduction device, respectively, based on a signal received from a computer-based authorization center.

6. The authorization verification method as claimed in claim 1, wherein the authorization data are stored in a data store of a computer-based authorization center, and the authorization data and the reference data are transmitted from the authorization center essentially in time sync via a telecommunication network to the first reproduction device and to the second reproduction device, respectively.

7. The authorization verification method as claimed in claim 1, wherein the alteration of reproduction attributes in the reproduction of the authorization data and in the reproduction of the reference data is made based on relevant data in the authorization data and in the reference data, respectively.

8. The authorization verification method as claimed in claim 1, wherein the alteration of reproduction attributes in the reproduction of the authorization data and in the reproduction of the reference data is made based on relevant data transmitted from an authorization center via a telecommunication network to the first reproduction device and to the second reproduction device, respectively.

9. The authorization verification method as claimed in claim 1, wherein the authorization data are transmitted from an authorization center via a telecommunication network to the first reproduction device, the alteration of reproduction attributes in the reproduction of the authorization data is made based on reproduction control data transmitted from a reproduction control center via the telecommunication network to the first reproduction device, the reference data are transmitted from the reproduction control center via the telecommunication network to the second reproduction device, and the alteration of reproduction attributes in the reproduction of the reference data is made based on data transmitted from the reproduction control center via the telecommunication network to the second reproduction device.

10. The authorization verification method as claimed in claim 1, wherein a display is used as a user interface on which the authorization data and the reference data can be shown, and reproduction attributes are used that include visual attributes, orientation details, details relating to the determination of a picture section, or position details.

11. The authorization verification method as claimed in claim 1, wherein authorization data and reference data are used that include service descriptors, and reproduction attributes are used that include details about fonts.

12. The authorization verification method as claimed in claim 1, wherein authorization data are used that include user identification data, and the reproduction of the user identification data is determined by the reproduction attributes.

13. The authorization verification method as claimed in claim 1, wherein an electroacoustic transducer is used as a user interface that can be used to reproduce the authorization data and the reference data, and reproduction attributes are used that include audio attributes of details about volume, pitch, or tone length.

14. A system for authorization verification, comprising:
a first electronic reproduction device including a user interface for reproducing authorization data;
a second electronic reproduction device including a user interface for reproducing reference data;
means for reproducing the authorization data using the user interface of the first reproduction device and for altering reproduction attributes during the reproduction of the authorization data in time sync with the reproduction of the reference data using the user interface of the second reproduction device, and with alterations of reproduction attributes during the reproduction of the reference data, respectively, so that the reproduction of the authorization data changes dynamically.

15. The system as claimed in claim 14, wherein the first reproduction device includes a data store that stores the authorization data, the second reproduction device includes a data store that stores the reference data, and the means for altering reproduction attributes are set up to make the alteration of the reproduction attributes based on details regarding the alteration in the reproduction attributes.

16. The system as claimed in claim 15, wherein the first reproduction device is set up to reproduce the authorization data based on a first synchronization signal using the user interface of the first reproduction device, the second reproduction device is set up to reproduce the reference data based on a second synchronization signal using the user interface of the second reproduction device, the first reproduction device is set up to produce the first synchronization signal, and the second reproduction device is set up to produce the second synchronization signal.

17. The system as claimed in claim 15, wherein the first reproduction device is set up to reproduce the authorization data based on a first synchronization signal using the user interface of the first reproduction device, the second reproduction device is set up to reproduce the reference data based on a second synchronization signal using the user interface of the second reproduction device, and the first reproduction device is set up to receive a signal from the second reproduction device and to produce the first synchronization signal based on the received signal, or the second reproduction device is set up to receive a signal from the first reproduction device and to produce the second synchronization signal based on the received signal.

18. The system as claimed in claim 15, wherein the first reproduction device is set up to reproduce the authorization data based on a first synchronization signal using the user interface of the first reproduction device, the second reproduction device is set up to reproduce the reference data based on a second synchronization signal using the user interface of the second reproduction device, the first reproduction device and the second reproduction device are set up to receive a signal from a computer-based authorization center, and the first reproduction device and the second reproduction device are set up to produce the first synchronization signal and the second synchronization signal, respectively, based on the received signal.

19. The system as claimed in claim 14, further comprising:
a computer-based authorization center including a data store that stores the authorization data, and the authorization center is set up to transmit the authorization data and the reference data essentially in time sync via a telecommunication network to the first reproduction device and to the second reproduction device, respectively.

20. The system as claimed in claim 14, wherein the means for altering the reproduction attributes during the reproduction of the authorization data are set up to make the alteration of the reproduction attributes based on relevant data in the authorization data.

21. The system as claimed in claim 14, further comprising:
a computer-based authorization center that is set up to transmit attribute data via a telecommunication network to the first reproduction device and to the second reproduction device, and the means for altering the reproduction attributes during the reproduction of the authorization data are set up to make the alteration in the reproduction attributes based on relevant attribute data that have been received from the authorization center.

22. The system as claimed in claim 14, further comprising:
a computer-based authorization center including a data store that stores the authorization data, wherein the authorization center is set up to transmit the authorization data via a telecommunication network to the first reproduction device;
a computer-based reproduction control center that is set up to transmit reproduction control data via the telecommunication network to the first reproduction device, and to transmit the reference data via the telecommunication network to the second reproduction device; and
wherein the means for altering the reproduction attributes during the reproduction of the authorization data are set up to make the alteration in the reproduction attributes based on the reproduction control data.

23. The system as claimed in claim 14, wherein the user interfaces each include a display for showing the authorization data and reference data, respectively, and the reproduction attributes include visual attributes of color details, orientation details, details relating to the determination of a picture section, position details, or details about fonts.

24. The system as claimed in claim 14, wherein the user interfaces each include an electroacoustic transducer for reproducing the authorization data and reference data, respectively, and the reproduction attributes include audio attributes of details about volume, pitch, or tone length.

25. The system as claimed in claim 14, wherein the first reproduction device is in a form of a mobile communication terminal.

26. The system as claimed in claim 14, wherein the first reproduction device is in the form of a chip card.

27. A computer program product comprising a computer-readable medium containing computer program code means for controlling one or more processors in a first electronic reproduction device that can be used in an authorization verification method such that, the first reproduction device reproduces authorization data using a user interface of the first reproduction device and alters reproduction attributes during the reproduction of the authorization data, so that the reproduction of the authorization data changes dynamically, where the authorization data are reproduced and the reproduction attributes are altered during the reproduction of the authorization data in time sync with reproduction of reference data using a user interface of a second electronic reproduction device and with alterations of reproduction attributes during the reproduction of the reference data, respectively.

28. The computer program product as claimed in claim 27, further comprising:

computer program code means that controls the processors in the first reproduction device such that the authorization data are stored in a data store of the first reproduction device, and wherein the reproduction attributes are altered based on details regarding the alteration of reproduction attributes.

29. The computer program product as claimed in claim 28, further comprising:

computer program code means that controls the processors in the first reproduction device such that the first reproduction device reproduces the authorization data based on a synchronization signal using the user interface of the first reproduction device, and the first reproduction device produces the synchronization signal.

30. The computer program product as claimed in claim 28, further comprising:

computer program code means that controls the processors in the first reproduction device such that the first reproduction device reproduces the authorization data based on a synchronization signal using the user interface of the first reproduction device, and the first reproduction device produces the synchronization signal based on a signal that the first reproduction device receives from the second reproduction device, or the first reproduction device transmits a signal to the second reproduction device for producing a synchronization signal in the second reproduction device.

31. The computer program product as claimed in claim 28, further comprising:

computer program code means that controls the processors in the first reproduction device such that the first reproduction device reproduces the authorization data based on a synchronization signal using the user interface of the first reproduction device, the first reproduction device receives a signal from a computer-based authorization center via a telecommunication network, and the first reproduction device produces the synchronization signal based on the received signal.

32. The computer program product as claimed in claim 27, further comprising:

computer program code means that controls the processors in the first reproduction device such that the first reproduction device receives the authorization data via a telecommunication network from a computer-based authorization center.

33. The computer program product as claimed in claim 27, further comprising:

computer program code means that controls the processors in the first reproduction device such that the first reproduction device receives the authorization data via a telecommunication network from a computer-based authorization center, the first reproduction device receives reproduction control data via the telecommunication network from a computer-based reproduction control center, and the first reproduction device alters the reproduction attributes during the reproduction of the authorization data based on the reproduction control data.

* * * * *